(12) United States Patent
Siikaniemi

(10) Patent No.: US 7,447,776 B2
(45) Date of Patent: Nov. 4, 2008

(54) PROVIDING A DIAL-UP CONNECTION IN A PACKET RADIO SYSTEM

(75) Inventor: Mikko Siikaniemi, Tampere (FI)

(73) Assignee: Nokia Corporation, Espoo (FI)

( * ) Notice: Subject to any disclaimer, the term of this patent is extended or adjusted under 35 U.S.C. 154(b) by 910 days.

(21) Appl. No.: 10/027,867

(22) Filed: Dec. 19, 2001

(65) Prior Publication Data

US 2002/0087701 A1 Jul. 4, 2002

(30) Foreign Application Priority Data

Dec. 29, 2000 (FI) ................................. 20002889

(51) Int. Cl.
*G06F 15/16* (2006.01)
(52) U.S. Cl. .................. 709/227; 709/238; 709/230
(58) Field of Classification Search ................. 709/227, 709/338, 230; 370/338
See application file for complete search history.

(56) References Cited

U.S. PATENT DOCUMENTS

| | | | | |
|---|---|---|---|---|
| 5,241,587 | A * | 8/1993 | Horton et al. ............. | 379/92.03 |
| 5,444,772 | A * | 8/1995 | Coker ......................... | 379/161 |
| 5,519,767 | A * | 5/1996 | O'Horo et al. ............. | 379/67.1 |
| 5,539,814 | A * | 7/1996 | Shoji ...................... | 379/215.01 |
| 5,636,209 | A * | 6/1997 | Perlman ..................... | 370/281 |
| 6,026,079 | A * | 2/2000 | Perlman ..................... | 370/260 |
| RE37,141 | E * | 4/2001 | O'Sullivan .................. | 455/557 |
| 6,374,102 | B1 * | 4/2002 | Brachman et al. ........ | 455/422.1 |
| 6,438,122 | B1 * | 8/2002 | Monrad et al. .............. | 370/349 |
| 6,643,262 | B1 * | 11/2003 | Larsson et al. .............. | 370/236 |
| 6,763,012 | B1 * | 7/2004 | Lord et al. .................. | 370/338 |
| 6,785,301 | B1 * | 8/2004 | Chapman et al. ........... | 370/522 |
| 6,847,610 | B1 * | 1/2005 | Suumaki et al. .......... | 370/230.1 |
| 6,904,025 | B1 * | 6/2005 | Madour et al. .............. | 370/328 |

(Continued)

FOREIGN PATENT DOCUMENTS

WO WO 9918741 * 9/1998

(Continued)

OTHER PUBLICATIONS

ETSI EN 301 344 v7.4.0, "Digital Cellular Telecommunications System (Phase 2+); General Packet Radio Service (GPRS); Service Description; Stage 2 (GSM 03.60 version 7.4.0 Release 1998)", 2000.

(Continued)

*Primary Examiner*—Bunjob Jaroenchonwanit
*Assistant Examiner*—Lan-Dai T Truong
(74) *Attorney, Agent, or Firm*—Perman & Green, LLP

(57) ABSTRACT

Providing a dial-up connection in a packet radio system comprising at least one mobile termination part, a terminal equipment part functionally connected thereto, and a packet radio network. A first packet data protocol context is activated between the packet radio network and the mobile termination part for reception and transmission of packet-switched data. A second packet data protocol context is activated between the packet radio network and the mobile termination part for a dial-up connection. The first context is deactivated in response to the second context being activated. The second context is deactivated in response to the dial-up connection being released. A third packet data protocol context, substantially conforming to the first context, is activated in response to the second context being deactivated.

13 Claims, 3 Drawing Sheets

U.S. PATENT DOCUMENTS

| | | | |
|---|---|---|---|
| 6,907,265 B1* | 6/2005 | Holmstrom et al. | 455/557 |
| 6,912,276 B1* | 6/2005 | Olafsson et al. | 379/93.35 |
| 2002/0032778 A1* | 3/2002 | Bullock et al. | 709/227 |
| 2002/0048354 A1* | 4/2002 | Perlman et al. | 379/93.25 |
| 2002/0064272 A1* | 5/2002 | Naghi et al. | 379/215.01 |
| 2003/0039237 A1* | 2/2003 | Forslow | 370/352 |

FOREIGN PATENT DOCUMENTS

| | | |
|---|---|---|
| WO | WO 00/76230 A1 | 12/2000 |
| WO | WO 00/78080 A1 | 12/2000 |

OTHER PUBLICATIONS

Digital Cellular Telecommunications System (Phase 2+); General Packet Radio Service (GPRS); Service description; Stage 2, GSM 03.60 version 7.3.1, 1998.

* cited by examiner

PROVIDING A DIAL-UP CONNECTION IN A PACKET RADIO SYSTEM

BACKGROUND OF THE INVENTION

The invention relates to providing a dial-up connection in a packet radio system, particularly to a mobile station already having an active packet data protocol context.

In addition to circuit-switched services, packet-switched GPRS service (General Packet Radio Service) is also standardized in the GSM system, particularly for the transmission of IP data (Internet Protocol). A network supporting GPRS service comprises a gateway GPRS support node (GGSN) and a serving GPRS support node (SGSN). The SGSN serves mobile stations (MS) attached to the GPRS network in its service area, transmits and receives data packets from said mobile stations and monitors the location of the mobile stations in its service area. The attachment of an MS to a GPRS network and, more particularly, to the SGSN, refers to the formation of a mobility management context for the MS, this function in a GPRS network being GPRS Attach. The GGSN acts as a gateway between the GPRS network and an external packet data network (PDN). External data networks include another network operator's GPRS network, the Internet, an X.25 network or a private local area network, for example.

In order for packet-switched data to be able to be transmitted between a mobile station and a network, a PDP context (Packet Data Protocol) has to be activated for the mobile station. When a PDP context is activated, the MS is bound to a PDP address (IP address) used in communicating with external networks. This changes the PDP state of the MS to active (ACTIVE state). In the GPRS standard, an MS is composed of a terminal equipment part (TE) and a mobile termination part (MT). The MT and the TE may be located physically in the same wireless device or e.g. a laptop computer may constitute the TE and a wireless device the MT. If the MT and the TE are physically in different devices, a connection is set up between them before transmission of data in the applications comprised by the TE.

Since radio resources are only used when data is transmitted, a GPRS mobile station may always have a PDP context activated when attached to a network. Mobile stations may be arranged to automatically activate also the PDP context when attaching to the GPRS network. The MT may act as a modem from the point of view of the TE comprised by a physically separate device, such as a laptop computer. In this case, a dial-up connection may be provided for e.g. an e-mail application for data transmission over a wireless network to a company's Intranet. A PPP (Point to Point Protocol) link may be set up between the TE and the MT for the dial-up connection of an application comprised by the TE, allowing transparent data transmission over the GPRS network from the point of view of the TE application. A PPP link may also be arranged for a dial-up connection between a terminal and a network element, typically the GGSN, of the packet radio network.

However, according to prior art, an existing active PDP context cannot be utilized for a dial-up connection. Even though the mobile termination part supports several simultaneous PDP contexts, its processing resources and memory are unnecessary loaded. In addition, if charging is based on time, the user pays unnecessarily for two active PDP contexts.

BRIEF DESCRIPTION OF THE INVENTION

The object of the invention is thus to provide a method and an equipment for implementing the method so as to avoid the above problems. The objects of the invention are achieved with a method, a mobile station and a wireless telecommunication system, which are characterized in what is stated in the independent claims. The preferred embodiments of the invention are disclosed in the dependent claims.

The invention is based on releasing the mobile termination part's first active context in response to a second context being activated for the mobile termination part for a dial-up connection. The dial-up connection may be provided for an application in the terminal equipment part for example by means of a PPP link between the terminal equipment part and the mobile termination part or the terminal equipment part and a packet radio network. The second context is deactivated when the dial-up connection is released. A third packet data protocol context substantially conforming to the first context is activated when the second context is deactivated.

The method and system of the invention provide the advantage that the resources of the mobile station and the network are not unnecessarily loaded by several simultaneously active packet data protocol contexts. The use of a mobile station is easier when the use of several different contexts does not have to be introduced to the user. Furthermore, unnecessary charging is not created.

In accordance with a preferred embodiment of the invention, a first context is activated when the mobile termination part is attached to a packet radio network in accordance with default parameters stored in advance in the mobile termination part. A third context is activated in accordance with the same default parameters. The first context can be activated automatically when the mobile station attaches to a packet radio network, and the third context after the dial-up connection is released, i.e. the mobile termination part is ready to transfer data automatically without user interference.

BRIEF DESCRIPTION OF THE FIGURES

In the following, the invention will be described in detail in connection with preferred embodiments with reference to the accompanying drawings, in which.

DETAILED DESCRIPTION OF THE INVENTION

The invention is applicable to any wireless telecommunication system providing packet-switched data transmission services, in which a dial-up connection can be provided for the TE. In the following, providing a dial-up connection in the GSM/GPRS system according to a preferred embodiment of the invention will be discussed.

Figure 1:
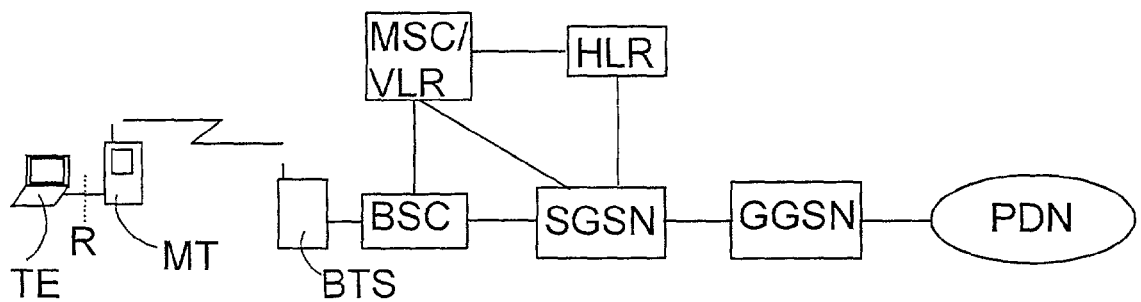
FIG. 1 shows a telecommunication system comprising a GPRS network.

FIG. 1 illustrates a wireless telecommunication system comprising a packet-switched GPRS network and a circuit-switched GSM network. Circuit-switched services of the GSM network are provided by a mobile switching centre MSCNLR that attends to connection set-up and routing calls to the right addresses. Two databases are used as assistance herein, and they contain data on mobile subscribers: a home location register HLR comprising data on all subscribers of the mobile network and the services ordered by them, and a visitor location register VLR comprising data on the mobile stations roaming the area of a given MSC/VLR.

As was described above, the GPRS network comprises operating nodes SGSN and gateway nodes GGSN. Both the SGSN and the MSC/VLR utilize the same base station system (BSS). The BSS comprises base transceiver stations (BTS) communicating with mobile stations MS over the radio path, and base station controllers (BSC) controlling the radio frequencies and channels available to base stations BTS connected thereto. The MSC/VLR and SGSN both also use the HLR. As to a more detailed description of a GPRS network, reference is made to the ETSI GPRS specifications. In the example of FIG. 1, the MT and the TE are physically in different devices, i.e. the TE in a laptop and the MT in a wireless communicator, which may also comprise the GSM functionality. The MT may also be a device to be connected to an expansion slot in a computer. It is to be noted that in the example of FIG. 1, the MT and the TE illustrate physically different devices. The device comprising the MT also comprises applications utilizing PDP contexts, in this example at least a WAP application (Wireless Application Protocol).

Figure 2:
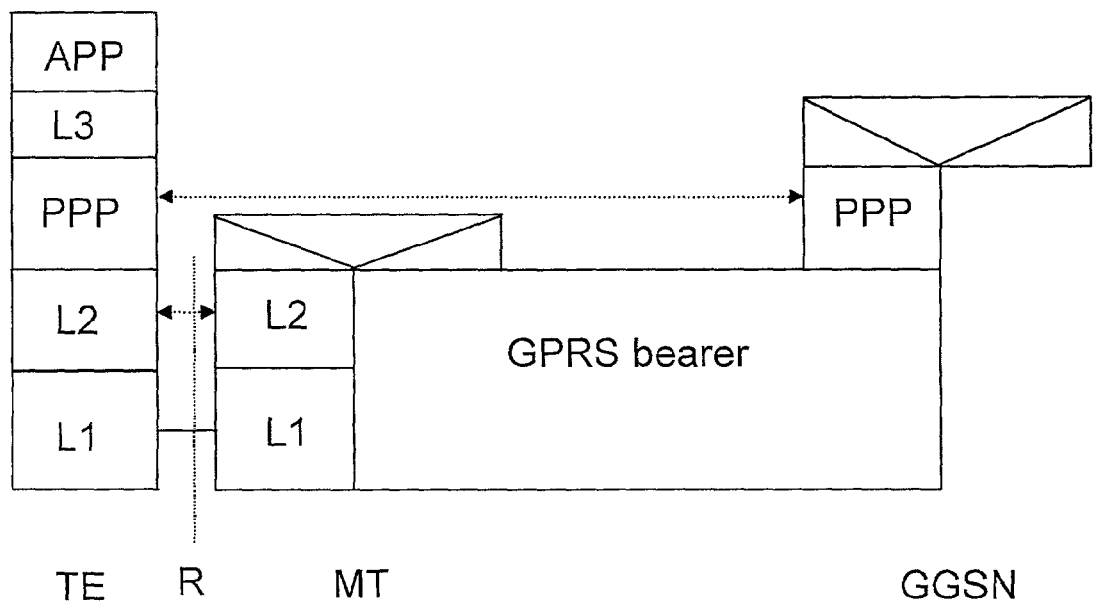
FIG. 2 illustrates the protocol stack of a system according to a preferred embodiment of the invention.

FIG. 2 illustrates the protocol stack of a system according to a preferred embodiment of the invention in providing a dial-up connection. The TE comprises an application level APP comprising one or more applications; e.g. an e-mail application, a WWW browser or a file transfer application. The protocol used on layer three is typically an IP protocol. A PPP link is set up between the TE and the GGSN for layer three data. The connection (L2/L1) between the MT and the TE may be implemented in a manner known per se, using infrared, a cable or a short-range radio frequency method (e.g. Bluetooth). FIG. 2 does not show the GPRS bearer service protocols (GPRS bearer) in any detail; as to a more specific description, reference is made to e.g. the ETSI (European Telecommunications Standards Institute) GPRS standard GSM 03.60 version 7.4.0; 'General Packet Radio Service (GPRS); Service Description: Stage 2'. A GGSN supporting a dial-up connection comprises a PPP layer above the GPRS protocol stack (GPRS bearer). Connections can be set up from the GGSN to external data networks by means of a PDN network-level protocol, preferably the IP.

Figure 3:
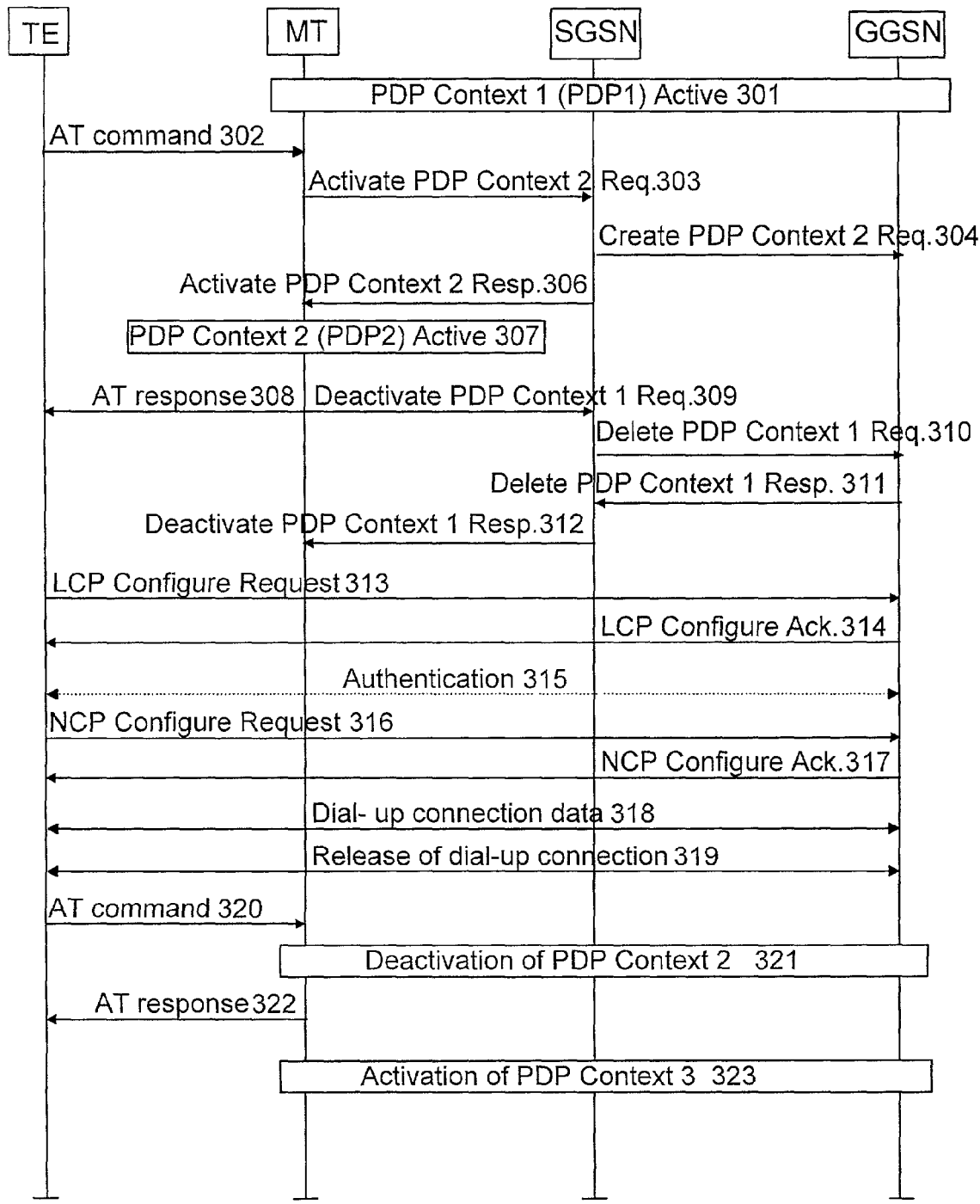
FIG. 3 is a signaling diagram of providing a dial-up connection according to a preferred embodiment of the invention in the system of FIG. 2.

FIG. 3 illustrates providing a dial-up connection according to a preferred embodiment of the invention in the system of FIG. 2, a PPP link being set up between the TE and the GGSN. A first packet data protocol context PDP1 is activated 301 at the MT, the SGSN and the GGSN. PDP1 can be used for the transmission of the data of an application comprised by the MT, such as a WAP browser. The PDP context may also be automatically activated always when attaching to a GPRS network, so PDP1 is not necessarily used by any application.

A dial-up connection is to be set up at the TE for the transmission of the data of an IP-based e-mail application, for example. The TE transmits a GPRS-specific AT command 302 to the MT for activating a second PDP context to be created for the dial-up connection. The message 302 preferably comprises data on the necessary PDP context, such as PDP type (PPP), access point name APN or information on the required quality of service (QoS). In the GPRS standard, the AT command 302 for activating a PDP context is CGACT.

The MT initiates the activation of the second PDP context PDP2 by transmitting a message 303 (Activate PDP Context 2 Req.). At this point, security functions may be carried out between the MT and the SGSN. The SGSN transmits a create PDP context request 304 (Create PDP Context 2 Req.) to the GGSN. Based on the PDP type of the request 304, the GGSN detects that a PPP link is involved and sets up a new PDP context. The GGSN transmits a response 305 (Create PDP Context 2 Resp.) back to the SGSN. The SGSN is arranged to transfer data associated with the PDP address. The SGSN transmits an activation acceptance message 306 (Activate PDP Context 2 Resp.) to the MT. The MT updates its context data with PDP2, whereupon PDP2 is active 307. The MT transmits a response 308 to AT command 302, based on which the TE knows that the second PDP context is activated.

When PDP2 is activated 307, the MT initiates deactivation of PDP1 by transmitting request 309 (Deactivate PDP Context 1 Req.) to the SGSN. The MT is arranged to initiate deactivation preferably automatically always when the context requested by the TE is successfully activated. This arrangement provides the advantage that when the activation of PDP2 fails, PDP1 is not unnecessarily deactivated. The SGSN transmits a request to delete 310 PDP1 (Delete PDP Context 1 Req.) to the GGSN. The GGSN deletes PDP1 and transmits response 311 (Delete PDP Context 1 Resp.) to the SGSN. The SGSN transmits information 312 (Deactivate PDP Context 1 Resp.) to the MT about the deactivated PDP1. This allows the resources of the MT to be centralized and priority to be given to the transfer of data of application APP, separately requested by the user of the TE. The need for IP addresses also decreases, since several IP addresses are not needed.

Once PDP2 is activated 307, the TE may initiate the set-up of a dial-up connection by transmitting a link-level control protocol LCP configuration request 313 (LCP Configure Request) according to the PPP protocol to the GGSN. Based on the request 313, a PPP link is set up between the TE and the GGSN. The PPP protocol of the GGSN transmits acknowledgement 314 (LCP Configure Ack.) to the TE. PPP authentication may then be performed 315 between the TE and the GGSN. To activate the network layer, the PPP protocol of the TE transmits request 316 (NCP Configure Request). The GGSN transmits acknowledgement 317 (NCP Configure Ack.) to the TE, whereby the network layer protocol is activated. A dial-up connection may then be provided via the PPP link to the application APP comprised by the TE, and data associated with the application may be transmitted and received 318 (Dial-up connection data).

The dial-up connection may be released 319 (Release of Dial-Up Connection) typically at the request of the application, the PPP link being released on the initiative of the TE or the GGSN by means of messages according to the PPP protocol. Once the dial-up connection is released, the TE notifies the MT with AT command 320 that PDP2 can be deactivated. PDP2 is deactivated 321 (Deactivation of PDP Context 2) at the MT's initiative in a manner known per se (cf. 309 to 312). Once PDP2 is deactivated, the MT may transmit information thereon to the TE with AT response 322.

Once PDP2, used for the dial-up connection, is deactivated, the MT initiates the activation 323 (Activation of PDP Context 3) of a third PDP context PDP3. The third PDP context is preferably activated in accordance with the same parameters as PDP1. Default parameters associated with the PDP context, according to which PDP1 can be automatically activated when the MS attaches to a GPRS network, may be stored in advance in the MS. These default parameters preferably include at least APN, QoS, PDP type and PDP address. If PDP1 is activated in accordance with these parameters, PDP3 is preferably similarly activated 323. These default parameters are preferably stored application-specifically, e.g. a WAP browser has its specific parameters. The MT may also store parameters, at least parameters deviating from the default parameters, of PDP1 before the data is deleted from the list of active PDP contexts. This allows the MT to activate PDP3 in accordance with the stored data. An ongoing session, e.g. a session between a WAP application and the WAP gateway, does not necessarily have to be released during a dial-up connection inside an application utilizing the MT's PDP1. Once PDP2 is deactivated, the MT application may request (323) the activation of a PDP context (PDP3) for example in accordance with application-specific parameters. Once PDP3 is activated, the connection required by the MT application can be set up again and data transfer can be continued from the point where it stopped in step 301.

It is to be noted that the steps can be carried out deviating from what is shown in FIG. 3; for example, the dial-up connection may be set up (313 to 317) immediately after the response 308 irrespective of the deactivation of the first PDP context (309 to 312).

In a dial-up connection directed to the TE, the MT acts as an answering modem and accepts the ITU-T V.250 AT commands associated with answering the call and transmitted by the PPP server (GGSN). The GGSN initiates the activation of the second PDP context (Network Initiated PDP Context Activation) when a dial-up connection has to be set up to the TE. The GGSN then sends information on incoming data to the SGSN serving the MT. The SGSN requests the MT to activate a PDP context, whereupon the MS activates PDP2 (steps 303 to 306). Once PDP2 is activated (307), PDP1 can be deactivated (303 to 306). Once the second PDP context is activated (307), a PPP link can be set up between the GGSN and the TE (313 to 317), and data may be transferred (318) on the dial-up connection. Once the dial-up connection is released (319), the MT is able to deactivate PDP2 (321) and activate (323) PDP3.

Figure 4:
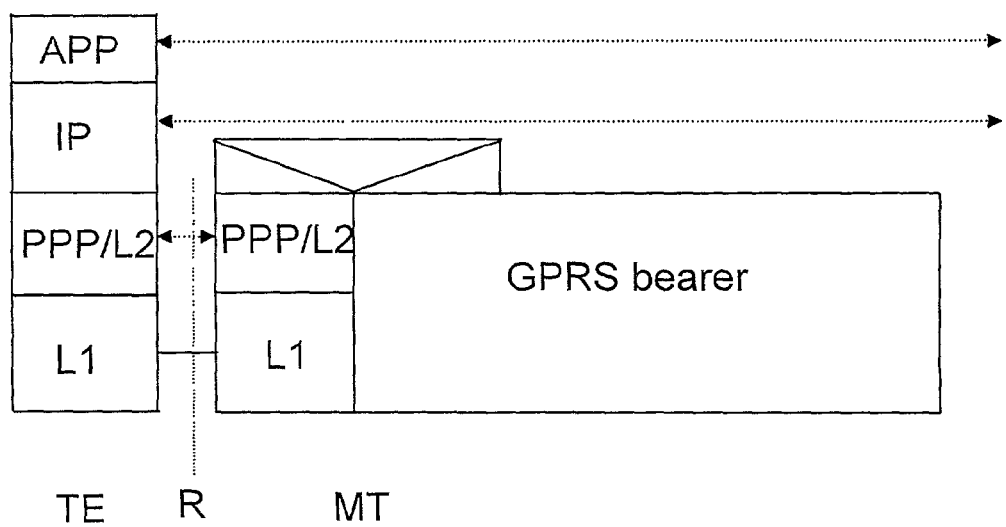
FIG. 4 illustrates the protocol stack of a system according to a preferred embodiment of the invention.

FIG. 4 illustrates the protocol stack of a system according to a preferred embodiment, wherein a PPP link is set up between the TE and the MT.

Figure 5:
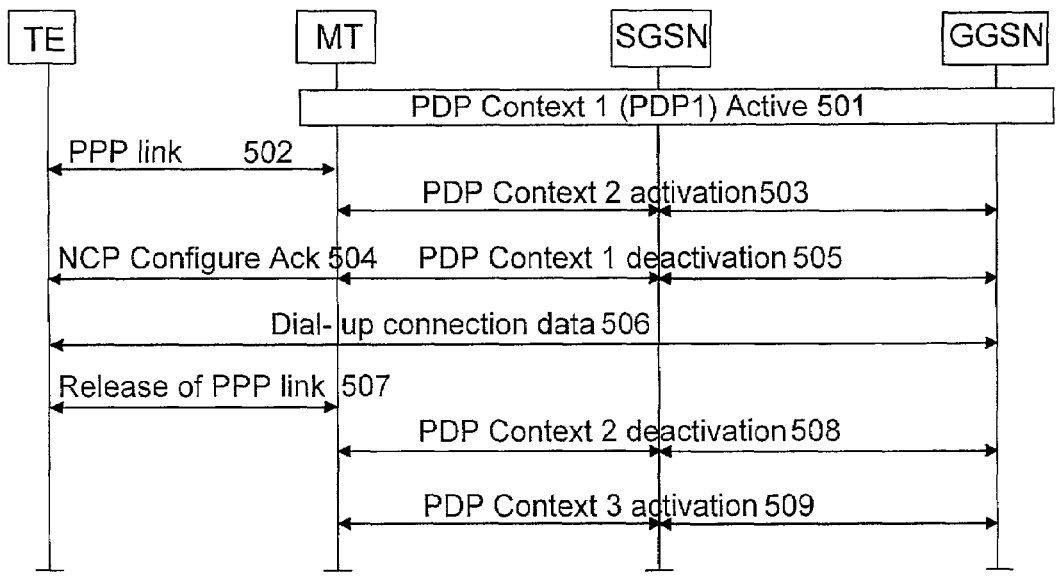
FIG. 5 is a signaling diagram of providing a dial-up connection according to a preferred embodiment of the invention in the system of FIG. 4.

FIG. 5 illustrates providing a dial-up connection in the system of FIG. 4. The first packet data protocol context PDP1 is activated 501 in the MT, the SGSN and the GGSN. When a dial-up connection is to be set up for a TE application, the MT and the TE act in accordance with the PPP protocol, set up 502 a PPP link, and typically perform authentication. On the initiative of the MT, PDP2 is activated 503 (PDP Context 2 Activation) for the dial-up connection. Once PDP2 is activated, the MT transmits 504 (NCP Configure Ack.) information to the TE about an activated IP protocol, whereupon the data of the TE application can be transferred 506 (Dial-up connection data). Once PDP2 is successfully activated, PDP1 is deactivated 505 (PDP Context 1 Deactivation) at the request of the MT. Once the PPP link is released 507, PDP2 can be deactivated 508 (PDP Context 2 Deactivation). The MT then activates 509 (PDP Context 3 Activation) the third PDP context PDP3, which substantially conforms to PDP1.

The invention is also well applicable when the PDP contexts PDP1-3 are contexts of anonymous access. The activation and deactivation of a PDP context in the SGSN and the GGSN are described in detail for example in GPRS standard GSM 03.60, version 7.4.0.

Figure 6:
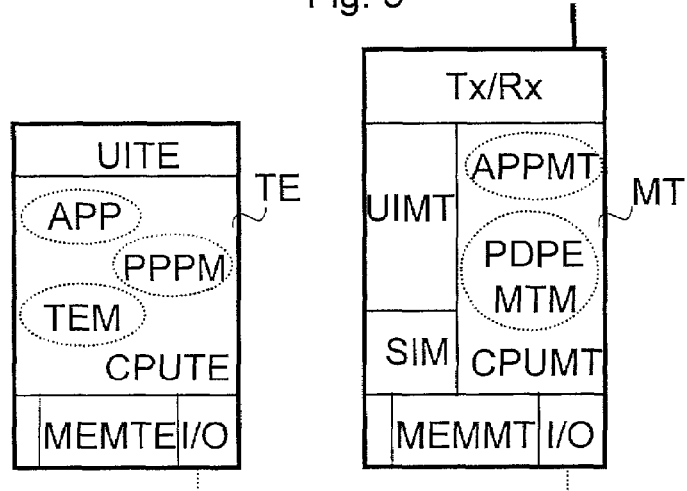
FIG. 6 is a block diagram of terminal equipment part and a mobile termination part according to a preferred embodiment of the invention.

FIG. 6 illustrates the structure of the TE and the MT when they are physically in different devices. The TE and the MT communicate via I/O buses, they comprise memory MEMTE, MEMMT, user interfaces UITE, UIMT, and processing units CPUTE, CPUMT. The user interfaces UITE, UIMT typically comprise a display, a keyboard, a microphone and a speaker. The MT also comprises a subscriber identity module SIM, in which short messages, for example, may be stored. The MT also comprises a transceiver Tx/Rx, which communicates with the BTS via an antenna.

Codes to be executed by the CPUTE and the CPUMT may be stored in the memories MEMTE, MEMMT. The CPUTE implements applications APP, PPP protocol means PPPM for a dial-up connection and terminal equipment means TEM for communicating with the MT. In the embodiment of FIG. 2, the TEM requests of a mobile termination means MTM the activation of the second PDP context (302 in FIG. 3) and deactivation (320) or, in the embodiment of FIG. 4, the activation (502) of a PPP link. The CPUMT implements applications APPMT, e.g. a WAP application, and the MTM attending to data transfer to the GPRS network and the TE by means of the MEM, the Tx/Rx, the SIM and the UI. The MTM comprises a context management entity PDPE, which is arranged to carry out the MT functions illustrated in FIGS. 3 and 5, such as the activation (303, 503) and deactivation (321, 508) of PDP2, typically at the request of the TEM, the deactivation of PDP1 (309, 505) in response to successful activation of PDP2, and activation of PDP3 (323, 509) in response to the deactivation of PDP2. The APP, PPPM, TEM, APPMT, MTM and PDPE can be implemented by means of existing processors and memories; integrated circuits can also be used.

Figure 7:
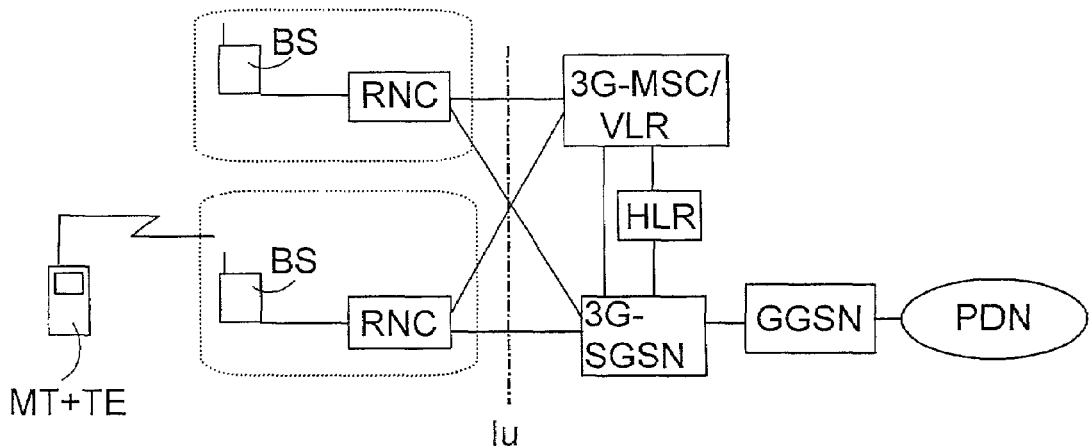
FIG. 7 shows the third generation UMTS system.

The invention is also well applicable to other systems comprising a packet radio network, such as the third generation UMTS system (Universal Mobile Telecommunications System) shown in FIG. 7. As FIG. 7 shows, the MT and the TE may also be implemented in the same physical device, which can be called user equipment UE. The system comprises base stations BS, or nodes B, supporting the radio interface Uu according to the wideband code division multiple access, i.e. WCDMA technology, radio network controllers RNC controlling the base stations. The core network comprises a third generation mobile switching centre 3GMSC/VLR for circuit-switched connections and a third generation operating node 3G-SGSN and a gateway node GGSN for packet-switched data transmission.

It is obvious to a person skilled in the art that as technology advances, the basic idea of the invention can be implemented in a variety of ways. The invention and its embodiments are thus not limited to the above examples, but may vary within the claims.

What is claimed is:

1. A method of arranging transmission of packet-switched data in a packet radio system having at least one mobile termination part operatively associated with a terminal equipment part for communication in a packet switched radio network, the method comprising:

activating a first packet data protocol context between said packet radio network and the mobile termination part for reception and transmission of packet-switched data, storing parameters relating to said first packet data protocol context;

activating a second packet data protocol context between the packet radio network and the mobile termination part to establish a dial-up connection by a link between the terminal equipment part and the mobile terminal part or the terminal equipment part and the packet radio network, releasing said first packet data protocol context in response to said second packet data protocol context being activated, in order to minimize processor and memory loading and avoid expense, releasing the dial-up connection, releasing said second packet data protocol context in response to the dial-up connection being released, and activating a third packet data protocol context, using said stored parameters relating to said first context, in response to said second packet data protocol context being released, and wherein the terminal equipment part and a packet network gateway support node (GGSN) support a PPP protocol (Point to Point Protocol), whereby said second context is activated for setting up a dial-up connection between the mobile termination part and the GGSN, a PPP link is set up between the terminal equipment part and the GGSN, and data associated with an application comprised by the terminal equipment part is transmitted by means of the PPP link and said second context.

2. A method as claimed claim 1, wherein said first packet data protocol context is activated to the packet radio network when the mobile termination part is attached to the packet radio network in accordance with default parameters stored in advance in the mobile termination part, and said third packet data protocol context is activated in accordance with the same default parameters.

3. A method as claimed in claim 1, wherein the terminal equipment part and the mobile termination part are physically in different devices, but are connected to allow the transmittal of applications data via the packet radio network, and said first and said third packet data protocol context are activated for transmission of data from an application stored by the mobile termination part.

4. A method as claimed in claim 1, wherein the terminal equipment part and the mobile termination part support a PPP protocol, a PPP link is set up between the terminal equipment part and the mobile termination part, and said second context is activated for data to be transmitted via the PPP link.

5. A method as claimed claim 1, wherein the packet radio system is GPRS.

6. A method according to claim 1, wherein the mobile termination part operatively associated with the terminal equipment are in the same device.

7. Apparatus comprising:

a terminal equipment part and a mobile termination part operatively associated to transmit packet switched data in a packet radio system;

a context management entity for activating and deactivating one or more packet data protocol contexts for communication in a packet switched radio network, wherein said mobile termination part is arranged to:

activate and store parameters relating to a first packet data protocol context between the packet switched radio network and the mobile termination part for reception and transmission of packet-switched data;

activate a second packet data protocol context between the packet radio network and the mobile termination part to establish a dial-up connection of the terminal equipment part by a link between the terminal equipment part and the mobile terminal part or the terminal equipment part and the packet radio network, release the active first packet data protocol context in response to said second packet data protocol context being activated, in order to minimize processor and memory loading and avoid expense, release the dial-up connection;

release said second packet data protocol context in response to the dial-up connection being released, and activate a third packet data protocol context, using said parameters relating to said stored first context, in response to said second context being released, and wherein said second packet data protocol context is activated for transmission of data of the dial-up connection between the terminal equipment part and the mobile termination part or for setting up a dial-up connection between the terminal equipment part and a gateway support node in the packet radio network.

8. Apparatus as claimed in claim 7, wherein the terminal equipment part and the mobile termination part are physically in different devices, but are connected to allow the transmittal of applications data via the packet radio network, said context management entity is arranged to activate said second packet data protocol context at the request of the terminal equipment part, and said context management entity is arranged to activate said first and said third packet data protocol context for the transmission of data from an application stored by the mobile termination part.

9. Apparatus according to claim 7 wherein the apparatus comprises a mobile station.

10. Apparatus as claimed in claim 7, wherein said context management entity is arranged to:

activate said first packet data protocol context in accordance with default parameters stored in advance in the mobile termination part, and activate said third packet data protocol context in accordance with the same default parameters.

11. A storage medium having processor readable code means embodied therein for causing cooperating processors to arrange transmission of packet-switched data in a packet radio system having at least one mobile termination part operatively associated with a termination equipment part for communication in a packet switched radio network, the processor readable code means comprising:

processor readable program code means for causing a processor to activate a first packet data protocol context between said packet radio network and the mobile termination part for reception and transmission of packet-switched data, processor readable program code means for causing a processor to store parameters relating to said first packet data protocol context;

processor readable program code means for causing a processor to activate a second packet data protocol context between the packet radio network and the mobile termination part to establish a dial-up connection by a link between the terminal equipment part and the mobile terminal part or the terminal equipment part and the packet radio network, processor readable program code means for causing a processor to release said first packet data protocol context in response to said second packet data protocol context being activated, in order to minimize processor and memory loading and avoid expense, processor readable program code means for causing a processor to release the dial-up connection, processor readable program code means for causing a processor to release said second packet data protocol context in response to the dial-up connection being released, and processor readable program code means for causing a processor to activating a third packet data protocol context, using said stored parameters relating to said first context, in response to said second packet data protocol context being released, and wherein the terminal equipment part and a packet network gateway support node (GGSN) support a PPP protocol (Point to Point Protocol), whereby processor readable program code means for causing a processor to activate said second context for setting up a dial-up connection between the mobile termination part and the GSSN, processor readable program code means for causing a processor to set up a PPP link between the terminal equipment part and the GGSN, and processor readable program code means for causing a processor to transmit data associated with an application comprised by the terminal equipment part by means of the PPP link and said second context.

12. The storage medium according to claim 11, wherein the mobile termination part operatively associated with the terminal equipment are in the same device.

13. The storage medium as claimed in claim 11, wherein the mobile station is a GPRS mobile station.

\* \* \* \* \*